(12) United States Patent
Leitch et al.

(10) Patent No.: US 7,679,523 B2
(45) Date of Patent: Mar. 16, 2010

(54) NETWORK FOR LOCATING A WIRELESS TAG

(75) Inventors: Adam S. Leitch, Brighton (GB); Neil C. Bird, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1016 days.

(21) Appl. No.: 10/573,721

(22) PCT Filed: Sep. 23, 2004

(86) PCT No.: PCT/IB2004/051841

§ 371 (c)(1),
(2), (4) Date: Mar. 27, 2006

(87) PCT Pub. No.: WO2005/031383

PCT Pub. Date: Apr. 7, 2005

(65) Prior Publication Data

US 2007/0096984 A1    May 3, 2007

(30) Foreign Application Priority Data

Sep. 27, 2003   (GB)   .................................. 0322684.2

(51) Int. Cl.
*G08B 5/22*   (2006.01)
(52) U.S. Cl. ............ 340/825.49; 340/10.3; 340/825.72; 340/531; 340/5.61; 340/3.1
(58) Field of Classification Search ................. 340/10.1, 340/10.3, 825.72, 531, 5.61, 3.1; 455/41.2, 455/3.03
See application file for complete search history.

(56) References Cited

U.S. PATENT DOCUMENTS

| 5,300,875 | A | * | 4/1994 | Tuttle | .......................... 320/138 |
| 2002/0137523 | A1 | * | 9/2002 | Diggelen | ..................... 455/456 |
| 2002/0175805 | A9 | * | 11/2002 | Armstrong et al. | ........ 340/10.31 |

FOREIGN PATENT DOCUMENTS

EP    0 242 983    10/1987

OTHER PUBLICATIONS

Colin Lanzl & Jay Werb: "Designing a Positioning System for Finding People and Things Indoors"; IEEE Spectrum; vol. 35, Issue 7; pp. 71-78; 1998.
Jeffrey Hightower et al: "Location Systems for Ubiquitous Computing"; IEEE Computer; vol. 34, Issue 8; pp. 57-66; 1998.

* cited by examiner

*Primary Examiner*—Vernal U Brown (57) ABSTRACT

A network for locating a wireless tag comprises a plurality of wireless nodes. The nodes are not connected together by a wired network. Each node is included in a floor tile for installation inside a building and configured to be wirelessly connectable to at least one other node. When the floor tiles are installed, the plurality of nodes form a mesh or grid and provide overlapping wireless coverage for locating the tag by reference to the mesh.

19 Claims, 11 Drawing Sheets

NETWORK FOR LOCATING A WIRELESS TAG

The present invention relates to a network for locating a wireless tag.

A number of different positioning systems are known which may be employed for tracking people and/or items inside a building.

"Designing a positioning system for finding people and things indoors" by Jay Werb and Colin Lanzl, IEEE Spectrum, volume 35, issue 7, pages 71 to 78 (1998) provides an overview of positioning systems and describes in detail a system which comprises a number of cells, each cell comprising a cell controller connected to a plurality of antennas by co-axial cable and which can be used to locate a tag which transmits a signal. If three or more antennas receive the signal, then the tag can be located.

"Location Systems for Ubiquitous Computing" by Jeffrey Hightower and Gaetano Borriello, IEEE Computer, volume 34, issue 8, pages 57 to 66 (1998) also provides survey of location systems including the well-known Global Positioning System (GPS). One system comprises a plurality of infrared detectors connected to a central server and which can be used to position a so-called "active badge" which emits an infrared signal. Another system comprises a plurality of ultrasonic sensors, mounted in a ceiling and connected to a controller, and which can be used to locate a so-called "Bat". The controller resets the sensors, sends a short-range radio signal which is received by the Bat, which in turn transmits an ultrasonic signal. The sensors measure the time between reset and time of arrival of the ultrasonic signal and reports this to the controller to determine the position of the bat.

These positioning systems, however, each suffer a drawback that they use cabling to connect detectors or antennae to a central controller. Therefore, these systems are time-consuming and expensive to install.

A possible solution is to use so-called "intelligent floor covering" wherein a chip is embedded in a floor tile. When the floor tiles are laid, each chip is connected to neighbouring chips by electrically conductive threads of the floor tile.

However, even this system is difficult to install because files must be properly joined for the system to operate. It also places limitations on where tiles can be placed.

The present invention seeks to provide an improved network for locating a wireless tag.

According to a first aspect of the present invention there is provided a network for locating a wireless tag, the network comprising a plurality of independent wireless nodes, each node being included in a layer or respective layer unit for installation inside a building and configured to be wirelessly connectable to at least one other node such that when the layer or layer units are installed, the plurality of nodes have a determinable spaced arrangement and provide overlapping wireless coverage for locating the tag by reference to the spaced arrangement.

By "independent", we mean "not connected together or to a common node by a wired network".

Thus, a network can be easily installed because each node does not need to be connected either to a neighbouring node or a central node by a wired network.

The layer may comprise a floor covering, such as a carpet or carpet underlay. Layer units may include tiles for covering a floor or a ceiling. The spaced arrangement may comprise a regular pattern of nodes. Each wireless node may include means for receiving a wireless signal and means for transmitting a wireless signal. Each wireless node may include means for determining a range to a neighbouring wireless mode, for example such as means for determining a time of arrival of a received signal and/or means for determining a value of signal strength of a received signal.

According to a second aspect of the present invention there is provided a network for locating a wireless tag, the network comprising a layer for installation inside a building and a plurality of independent wireless nodes included in the layer, each node configured to be wirelessly connectable to at least one other node.

According to a third aspect of the present invention there is provided a network element for forming part of a network for locating a wireless tag, the network element comprising a layer unit for installation inside a building and an independent wireless node included in the layer unit and configured to be wirelessly connectable to at least one other node.

The network a network element may further comprise means for generating power for a wireless node, such as a piezoelectric crystal. The network a network element may further comprise means for receiving power for a wireless node from an external source, preferably in the form of an inductive means, such as a loop or coil.

According to a fourth aspect of the present invention there is provided a method of locating a wireless tag using a network comprising a plurality of independent wireless nodes, each node being included in a layer or respective layer unit installed inside a building and configured to be wirelessly connectable to at least one other node, the method comprising determining a spaced arrangement of the wireless nodes and determining the location of the wireless tag with reference to the spaced arrangement.

Determining the spaced arrangement of the wireless nodes may comprise transmitting a first message from a first node, the first message identifying the first node, noting a time of arrival of the first message at a second node and transmitting a second message from the second mode, the second message identifying the first and second nodes, the time of arrival of the first message and a time of transmission of the second message. The method may further comprise transmitting a message from the second node identifying the location of the second node within the spaced arrangement.

According to a fifth aspect of the present invention there is provided a method of operating a wireless node included in a layer or respective layer unit installed inside a building and configured to be wirelessly connectable to at least one other node, the method comprising co-operating with the at least one other node so as to determine location of the wireless node within a spaced arrangement of wireless nodes and co-operating with a wireless tag so as to determine location of the wireless tag with reference to the spaced arrangement of wireless nodes.

According to a sixth aspect of the present invention there is provided a computer program comprising instructions which, when executed by data processing apparatus, causes the data processing apparatus to perform the method.

Embodiments of the present invention will now be described, by way of example with reference to the accompanying drawings in which.

Network 5

Figure 1:
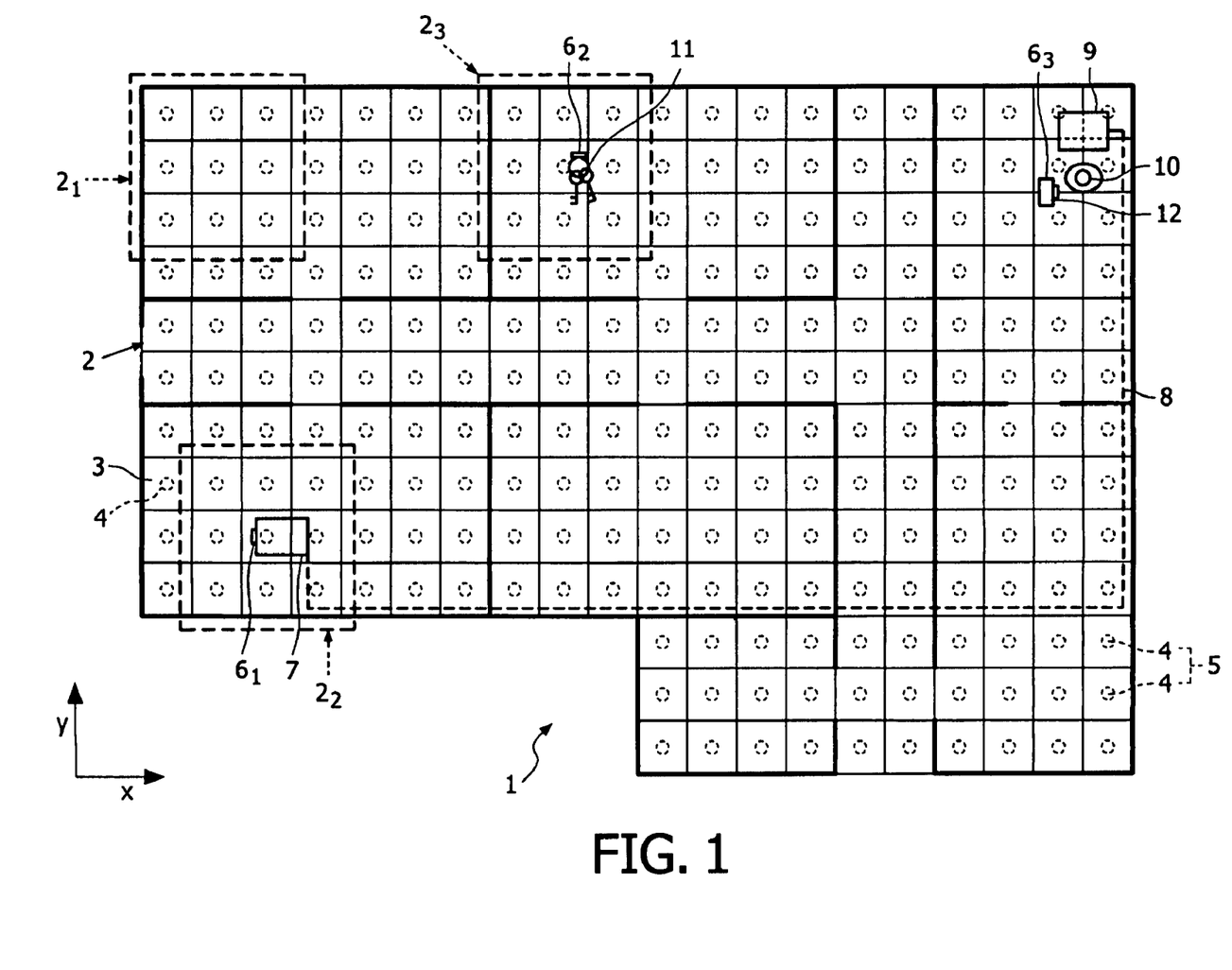
FIG. 1 is a plan of a floor of a building in which an embodiment of a network according to the present invention is used.

Referring to FIG. 1, a plan of a floor 1 of a building 2 in which an embodiment of the present invention is used is shown. In this example, the building is an office. However, the building 2 may be any type of domestic, commercial, industrial or public building such as a house, a block of flats, warehouse, factory, train or bus station, airport, theatre or cinema, hospital or government office.

A plurality of layer units, which in this example take the form of floor tiles 3, are laid on the floor 1 in the building 2. Each floor tile 3 includes a wireless node 4. The wireless node 4 may be placed in or under the tile 3. Preferably, the floor tiles 3 are square and are laid in a regular pattern. However, other shapes of floor tiles 3 may be used and all the tiles need not be the same shape. Furthermore, the floor tiles 3 need not be laid regularly. Moreover, conventional floor tiles (not shown), i.e. floor tiles without wireless nodes, may be included either regularly or irregularly. Thus, floor tiles 3 may be sparsely used. Additionally or alternatively, a layer may be used, for example in the form of a carpet (not shown) or a carpet underlay (not shown) including wireless nodes distributed across the layer, i.e. in the x-y plane. The layer units may take the form of ceiling tiles.

In accordance with the present invention, the wireless nodes 4 provide a network 5 for locating a wireless tag $6_1$, $6_2$. In a first example, a first wireless tag $6_1$ is attached to or embedded in a printer 7. As will be explained in more detail later, the locating network 5 can be used to enable the printer 7 to ascertain its position. The printer 7 can transmit this information via a local area network 8 to a computer 9 to allow a user 10, such as an officer charged with tracking company assets or an IT manager, to track the location of the printer 7. In a second example, a second wireless tag $6_2$ is incorporated into a key ring 11. As will be explained in more detail later, the locating network 5 can be used to locate the key ring 11 and thus help the user 10 to find their keys using, for example computer 9 or a personal digital assistant 12.

Figure 2:
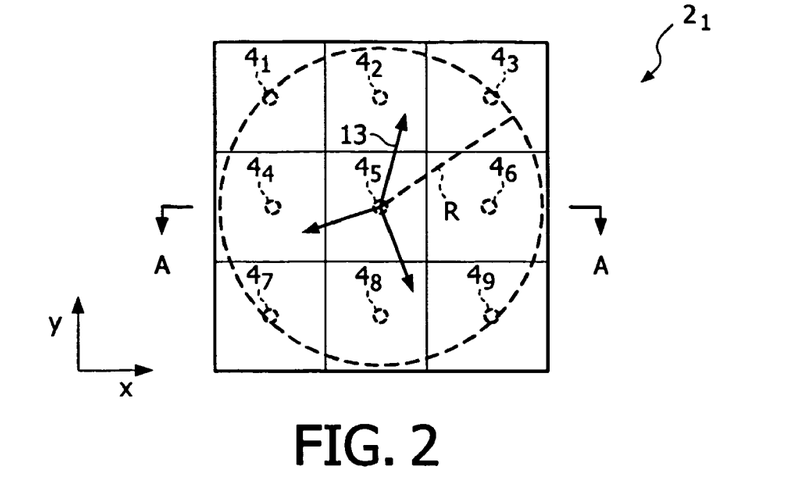
FIG. 2 is a magnified view of a portion of the plan shown in FIG. 1.
Figure 3:
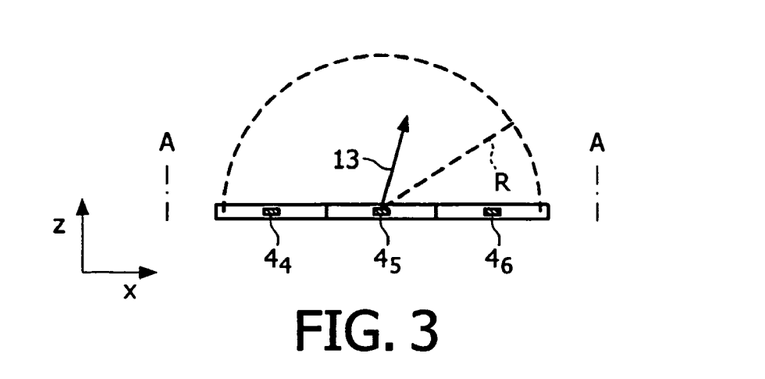
FIG. 3 is a cross-section of the portion of the plan shown in FIG. 2 taken along the line A-A.

Referring to FIGS. 2 and 3, a wireless node $4_5$ transmits a signal 13 whose signal strength, S, depends on radial distance, r, from the wireless node $4_r$. For example, in the case of a radio signal, the signal strength may be inversely proportional to the square of the distance r, namely:

$$S = \frac{S_0}{1 + I(r)^2} \quad (1)$$

where k is constant.

Thus, for a given detection threshold $S_T$, a range R of transmission for the wireless node $4_5$ may be defined such that $R=1/k \sqrt{(S_0/S_T)}$ when $(k)^2 R$ 1. Values of $S_0$ and $S_T$ are chosen such that the wireless node $4_1$ can directly transmit and receive signals to and from at least one neighbouring wireless node $4_1$, $4_2$, $4_3$, $4_4$, $4_6$, $4_7$, $4_8$, $4_9$. Preferably, values of $S_0$ and $S_T$ are chosen such that the wireless node $4_5$ can only directly transmit and receive signals to and from only the $n^{th}$-nearest wireless nodes. For example, as shown in FIG. 3, the wireless node $4_5$ can only directly transmit and receive signals to and from the nearest and next nearest wireless nodes (i.e. n=2). Thus, a radiating pattern is hemispherical. Nevertheless, antenna producing different radiating patterns may be used.

The wireless nodes 4 are independent. By "independent" we mean that the nodes 4 are not connected together or to a central node by a wired network. Thus, tiles 3 may be easily installed, moved or removed.

Wireless Node 4

Figure 4:
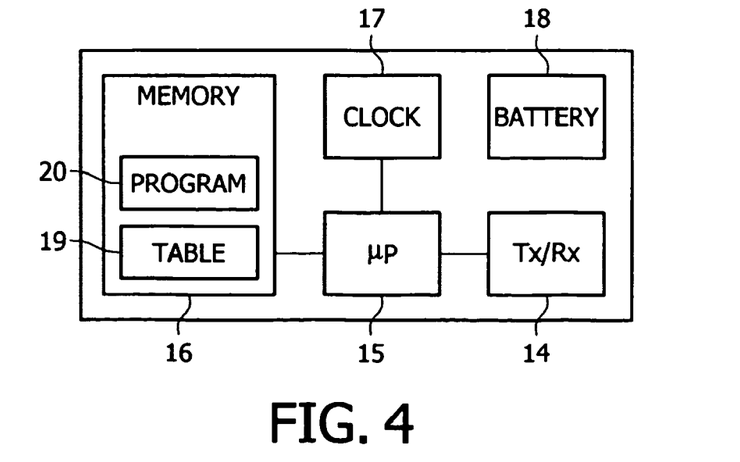
FIG. 4 is a schematic diagram of a wireless node.

Referring to FIG. 4, a wireless node 4 comprises means 14 for receiving and transmitting wireless signals, means 15 for processing signals, means 16 for storing data, means 17 for keeping time and means 18 for storing power.

The wireless receiving and transmitting means 14 is preferably in the form of a short-range radio transceiver circuit with integrated antenna. However, a separate antenna (not shown) may be provided. One or more fibres of the tile 3 may form the antenna. The processing means 15 is preferably in the form of a microcontroller. The storing means 16 is preferably in the form of non-volatile memory and stores a computer program 19 for controlling operation of the wireless node 4 and a table 20 comprising a list of node identifies and corresponding position data. The power storing means 18 is preferably in the form of battery.

Preferably, the wireless node 4 is compliant with Zigbee™ standards. However, the wireless node 4 may be compliant with other standards such as Bluetooth™ or IEEE 802.11x.

According to Zigbee™ standards, 255 devices can be wirelessly connected to form a network, although a greater number of devices can be wirelessly connected using multiple Zigbee™ networks. A device can operate in 2.4 GHz, 915 MHz and/or 868 MHz radio frequency bands, support raw data transfer rates of 250 kilobits per second (kbps), 40 kbps and 20 kbps respectively and have a transmission range of typically 10 metres and up to 75 metres. Preferably, each device has a transmission range of between 2 and 5 meters. An overview of the Zigbee™ standards may be obtained via the World Wide Web at www.zigbee.org or from the Zigbee™ Alliance, Bishop Ranch, 22694 Bishop Drive, Suite 275, San Ramon, Calif. 94583, USA.

Locating Wireless Nodes 4

Referring again to FIG. 1, the wireless nodes 4 form a spaced arrangement known as a "mesh" or "grid". Each node 4 can locate itself or be located relative to neighbouring nodes 4 by exchanging signals, determining a distance between the node 4 and each neighbouring node 4 and using trilateration methods similar to those used in GPS. Thus, the spaced arrangement of nodes 4 can be determined.

A preferred method of determining distance comprises determining time of flight of a signal between nodes 4. However, additionally or alternatively other methods may be used, such as determining a received signal strength indication (RSSI).

Figure 5:
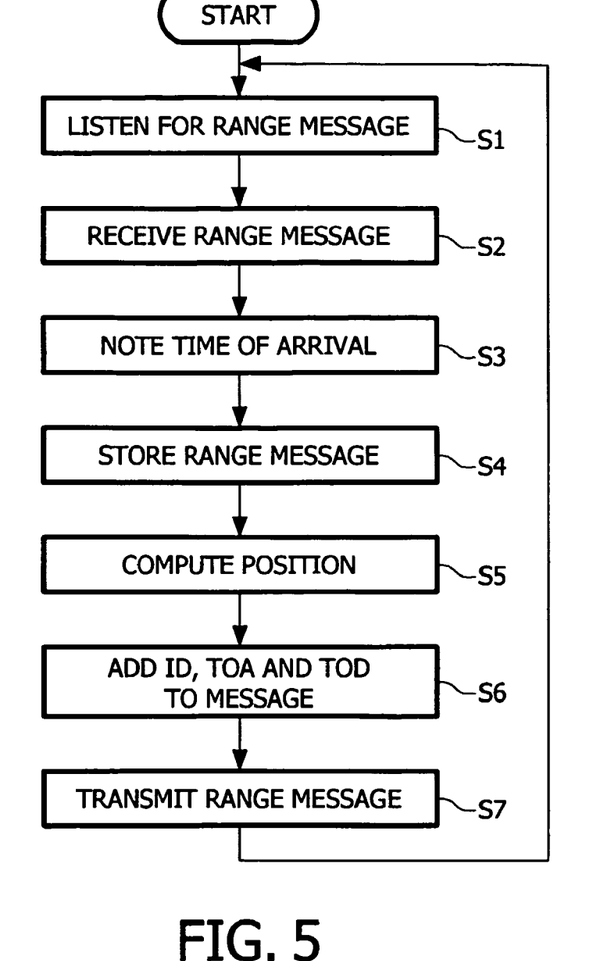
FIG. 5 is a process flow diagram of a method of determining an arrangement of spaced, wireless nodes.
Figure 6:
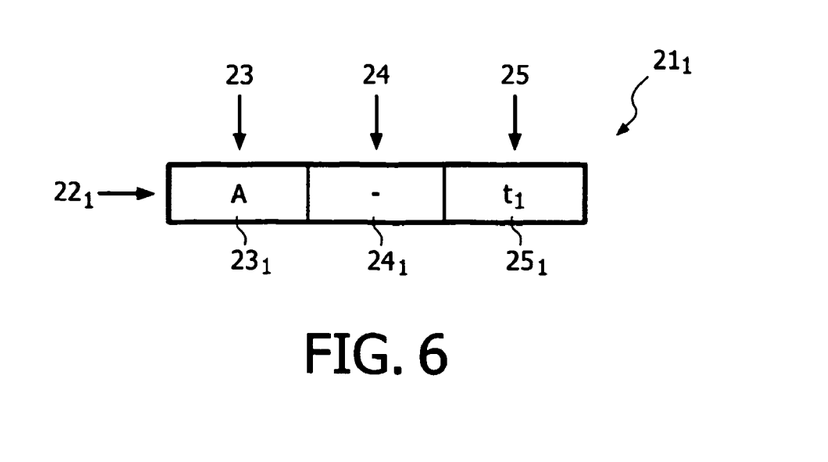
FIG. 6 shows content of a first message.
Figure 7:
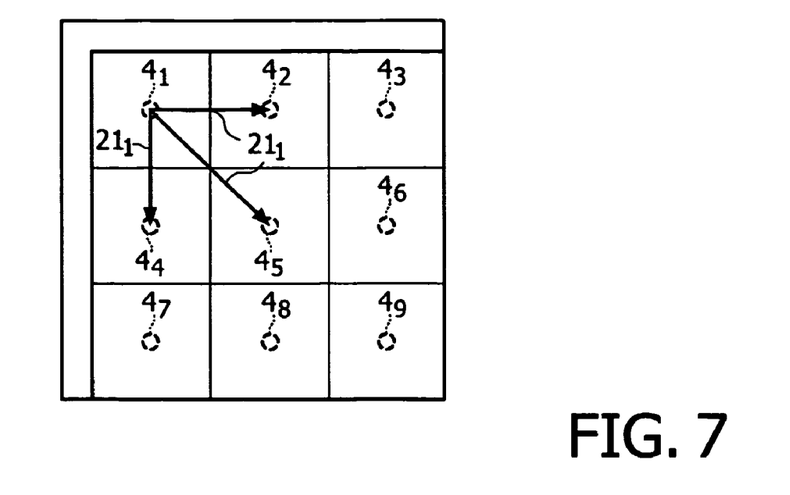
FIG. 7 illustrates transmission of the first message shown in FIG. 6 to neighbouring nodes.

A process by which location information flows through the network 5 and by which the spaced arrangement of nodes 4 can be determined will now be described:

Referring to FIGS. 5, 6 and 7, a first wireless node $4_1$ acts as a network coordinator. The first wireless node 4, prepares a message $21_1$ comprising a first entry $22_1$. Each entry comprises a field 23 for identifying the node, a field 24 giving a time of arrival (TOA) of a previously received signal and a field 25 giving a time of departure (TOD) of a currently transmitted signal. TOD may also be referred to as time of transmission. In this case, a first identifying field $23_1$ comprises value "A", a first TOA field $24_1$ is left blank or filled with a dummy value and a first TOD field $25_1$ comprises a value $t_1$. The value in the first TOD field $25_1$ is measured using clock 17 (FIG. 4) and may be adjusted by adding a fixed delay to take account of the time needed to prepare and send the message $22_1$. The message $21_1$ is transmitted to neighbouring nodes $4_2$, $4_4$, $4_5$ within a range R.

Taking the second node $4_2$ as an example of how a node 4 operates, the second node $4_2$ listens for messages 21 (step S1), receives a message 21 (step S2), in this case message $21_1$, notes its time of arrival (step S3) and stores the message $21_1$ in table 19 (FIG. 4) (step S4). Optionally, if has enough range measurements, the node 42 may computes its position using trilateration.

Figure 8:
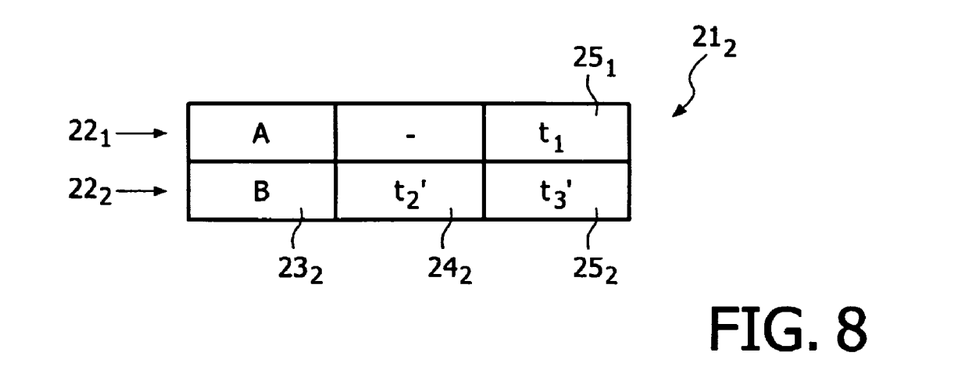
FIG. 8 shows content of a second message.
Figure 9:
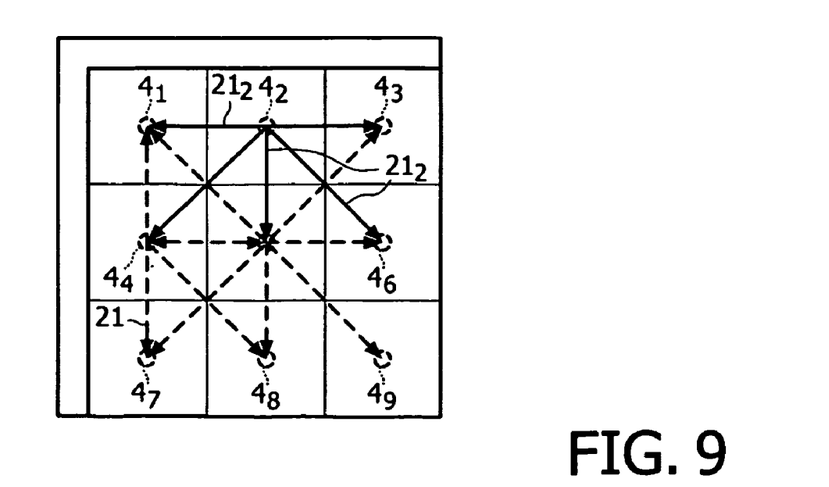
FIG. 9 illustrates forward transmission of a second set of messages to neighbouring nodes.

Referring to still to FIG. 5 and also to FIGS. 8 and 9, the second node $4_2$ prepares a second message $21_2$ by adding a second entry $22_2$ after the first entry $22_1$, the second entry $22_2$ including a second identifying field $23_2$ comprising value "B", a second TOA field $24_2$ comprising value $t_2$' and a second TOD field $25_2$ comprising value $t_3$' (step S6). The value in the first TOD field $25_1$ is measured using clock 17 (FIG. 4). The message $21_2$ is transmitted to neighbouring nodes $4_1$, $4_3$, $4_4$, $4_5$, $4_6$ (step S7). Messages 21 transmitted by the fourth node 44 at substantially the same time and by the fifth node $4_5$ a short time later are shown as dotted lines.

Each node 4 performs and repeats this process whenever it receives a message 21. Each time a node 4 receives a message 21, it stores it in memory 16 thereby increasing the number of range measurements.

If two nodes 4 exchange messages 21, then clock drift for one of the clocks 17 (FIG. 4) may be corrected. Taking the example of the first and second nodes $4_1$, $4_2$ once the first node $4_1$ receives the second message $21_2$, it has enough information to correct for clock drift. The information comprises the time of departure of the first message $21_1$ from the first node $4_1$, i.e. $t_1$, the time of arrival of the first message $21_1$ at the second node $4_2$, i.e. $t_2$', the time of departure of the second message $21_2$ from the second node $4_2$, i.e. $t_3$', and the time of arrival of the second message $21_2$ at the first node $4_1$, i.e. $t_4$. If the clock 17 of the second node $4_2$ is adrift by a fixed amount, x, relative to the clock 17 of the first node $4_1$, i.e. t'=t+x, then the first node $4_1$ can compensate for the drift.

The time of flight $\Delta t_{AB}$ between the first and second nodes $4_1$, $4_2$ is:

$$\Delta t_{AB} = \frac{(_1t - t_4) - (_2't - t_3')}{2} \quad (2)$$

$$= \frac{(_1t - t)(\mp(t + x_2)(-t_3 x))}{2}$$

$$= \frac{(_1t - t_4) - (_2t - t_3)}{2}$$

Note that the term x does not appear in the final line.
The drift can be explicitly calculated using:

$$x = \frac{'t}{2} \Delta t_B \quad (3)$$

Usually the clock 17 of the first node $4_1$ is the clock to which the whole network 5 is synchronised. Any node may ascertain, and optionally correct, its own clock drift by exchanging a series of linked messages (via other nodes 4) with the first node $4_1$ or a node 4 known to have a clock 17 (FIG. 4) which has been corrected for drift. It will be appreciated that this can happen once enough messages 21 have passed back and forth though the network 5. Alternatively, a node 4 may request the first node $4_1$ to inform it of its clock drift.

The first node $4_1$ gathers a plurality of messages 21 which have propagated through the network 5. For example, the first node $4_1$ transmits the first message $21_1$ to the second node $4_2$, the second node $4_2$ transmits the second message to the third node $4_3$, the third node $4_3$ transmits a fourth message to a neighbouring node 4 and so on. Each time a message 21 is transmitted, not only does it propagate further into the network 5 away from the first node $4_1$, but also returns back, towards the first node $4_1$. Moreover, messages 21 can propagate by a circuitous route. In this way, the first node $4_1$ may eventually receive a plurality of messages 21, each of which have passed through a node 4 and returned to the first node $4_1$ via different routes. Using trilateration, the first node $4_1$ can calculate the positions of all the nodes 4 of the network. Preferably, range times are converted into range distances using speed c=31×0$^8$ ms$^{-1}$ and positions are expressed in Cartesian coordinates (x, y). An absolute position at least one network nodes 4 may be supplied thereto or an indication of whether one node is considered to be an origin.

In fact, each node 4 may gather messages 4 in the same way and, using trilateration, can calculate the positions of all the nodes 4 of the network.

The first message $21_1$ may trigger an avalanche of further messages 21. Therefore, each node 4 may limit transmission of messages. For example, each node may limit the number of entries $22_1$, $22_2$ in a message 21 by adding a new entry and deleting the oldest entry. Additionally or alternatively, each node, if it has just transmitted a message 22, may ignore the next message 22 received from a neighbouring node 4. Nodes may selectively limit transmission of messages at different times. For example, each node 4 may transmit a given number of messages initially and thereafter limit transmission of messages.

Thus, by exchanging messages 21, a first node $4_1$ or each node 4, may determine location of nodes 4 within the network 5 and, thus, the spaced arrangement of nodes 4.

The spaced arrangement of nodes 4 can be used to locate a tag $6_1$, $6_2$ by transmitting and/or receiving signals to and/or from the tag $6_1$, $6_2$.

Locating Printer 7

As mentioned earlier, a first wireless tag $6_1$ is attached to or embedded in a printer 7. The wireless tag $6_1$ comprises a wireless node 4 and a data interface (not shown) to the printer 7.

Figure 10:
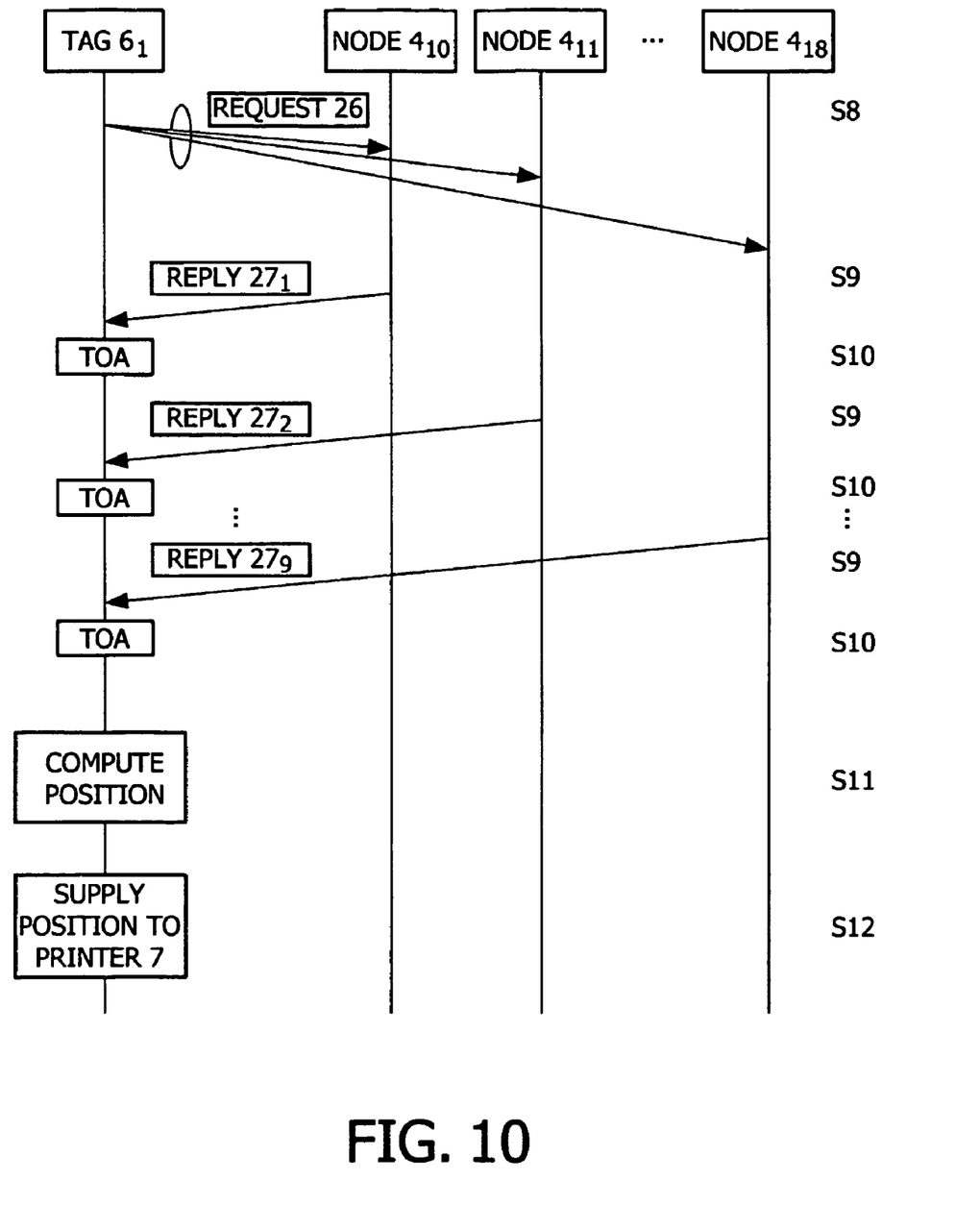
FIG. 10 is a process diagram of transmission of a request by a wireless tag and reception of replies from wireless nodes.
Figure 11:
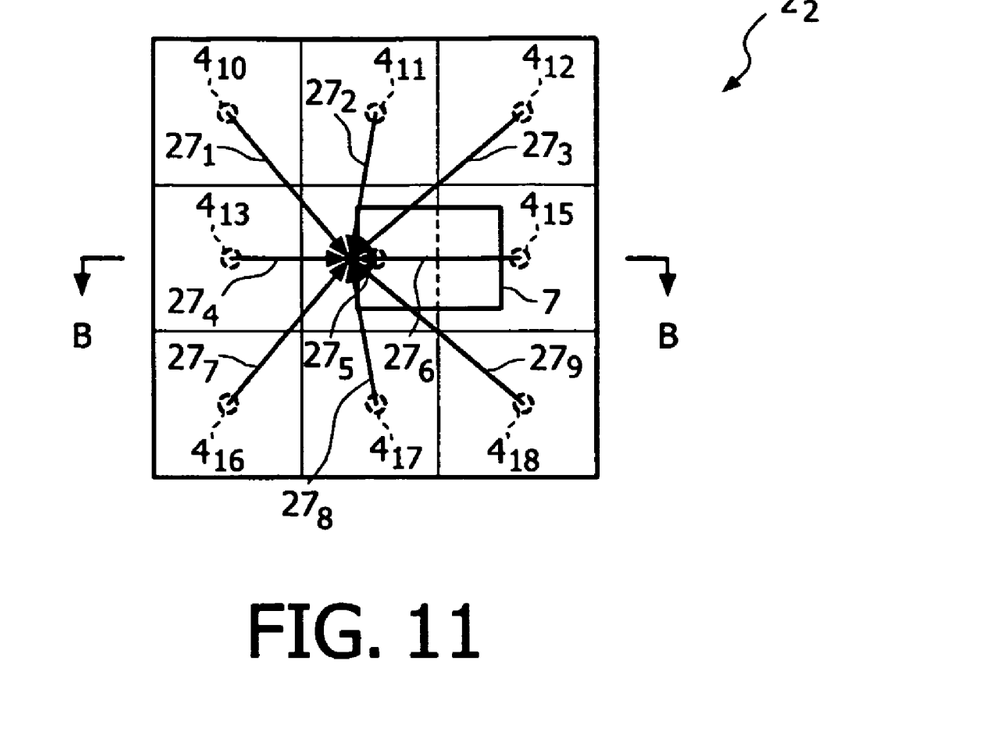
FIG. 11 is a magnified view of a portion of the plan shown in FIG. 1 in which a wireless tag associated with a printer is located relative to a number of wireless nodes.
Figure 12:
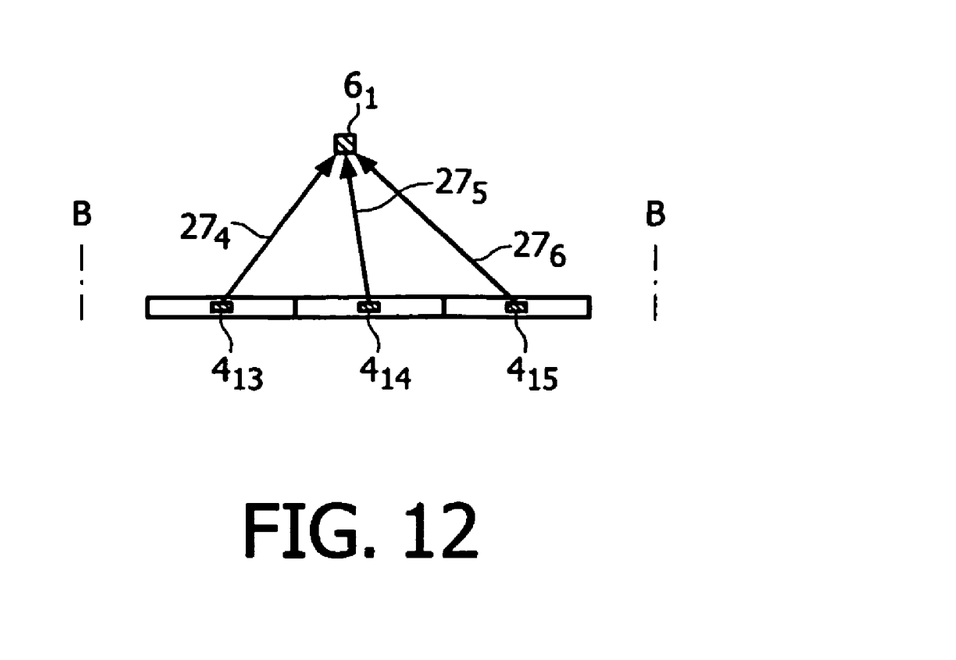
FIG. 12 is a cross-section of the portion of the plan shown in FIG. 11 taken along the line B-B.

Referring to FIGS. 10, 11 and 12, the wireless tag $6_1$ is within range of a number of nodes $4_{10}$, $4_{11}$, $4_{12}$, $4_{13}$, $4_{14}$, $4_{15}$, $4_{16}$, $4_{17}$, $4_{18}$. The wireless tag $6_1$ periodically "wakes up" and broadcasts a request 26 for position information (step S8).

The nodes $4_{10}$, $4_{11}$, $4_{12}$, $4_{13}$, $4_{14}$, $4_{15}$, $4_{16}$, $4_{17}$, $4_{18}$ transmit respective replies $27_1$, $27_2$, $27_3$, $27_4$, $27_5$, $27_6$, $27_7$, $27_8$, $27_9$ which are received by the wireless tag $6_1$, for example as illustrated in FIGS. 11 and 12 (step S9). Each reply $27_1$, $27_2$, $27_3$, $27_4$, $27_5$, $27_6$, $27_7$, $27_8$, $27_9$ includes an identity, a position and a time of departure of the wireless node $4_{10}$, $4_{11}$, $4_{12}$, $4_{13}$, $4_{14}$, $4_{15}$, $4_{16}$, $4_{17}$, $4_{18}$ transmitting the reply. The wireless tag $6_1$ receives the replies $27_1$, $27_2$, $27_3$, $27_4$, $27_5$, $27_6$, $27_7$, $27_8$, $27_9$ and notes their time of arrival (step S10). FIG. 10 is illustrative and does not necessarily show the order in which replies $27_1$, $27_2$, $27_3$, $27_4$, $27_5$, $27_6$, $27_7$, $27_8$, $27_9$ are received by the wireless tag $6_1$. However, FIGS. 11 and 12 show that the distance between the tag $6_1$ and respective nodes $4_{10}$, $4_{11}$, $4_{12}$, $4_{13}$, $4_{14}$, $4_{15}$, $4_{16}$, $4_{17}$, $4_{18}$ differ and thus will be reflected in the time of flight, $\Delta t$.

Assuming that the clocks 17 (FIG. 4) of all the nodes $4_{10}$, $4_{11}$, $4_{12}$, $4_{13}$, $4_{14}$, $4_{15}$, $4_{16}$, $4_{17}$, $4_{18}$ are synchronised, i.e. have been compensated for drift and tell "network time", then the wireless tag $6_1$ can determine its position using trilateration (step S11).

However, if the clocks 17 (FIG. 4) of the nodes $4_{10}$, $4_{11}$, $4_{12}$, $4_{13}$, $4_{14}$, $4_{15}$, $4_{16}$, $4_{17}$, $4_{18}$ are not synchronised, the wireless tag $6_1$ may transmit a second request (not shown), including a time of departure, and receive a second set of replies (not shown) and correct for drift of each clock 17 (FIG. 4) of each node $4_{10}$, $4_{11}$, $4_{12}$, $4_{13}$, $4_{14}$, $4_{15}$, $4_{16}$, $4_{17}$, $4_{18}$ using the process described earlier.

The wireless tag $6_1$ supplies the position to the printer 7 (step S12), which may be stored in memory (not shown). The printer 7 transmits the position via the local area network 8 to the computer 9 either on request or unprompted, for example periodically or whenever a change in position is detected. Thus, the position of the printer 7 may be tracked by user 10.

Alternatively, the wireless tag $6_1$ may behave as if it were a wireless node 4 in the network 5 and locate itself in the manner described earlier when the network 5 is established. The wireless tag $6_1$ can perform position updating whenever there is a change in position resulting from the printer 7 being moved.

It will be appreciated that the wireless tag $6_1$ may determine its position by receiving messages from or using only three or more of the neighbouring nodes $4_{10}$, $4_{11}$, $4_{12}$, $4_{13}$, $4_{14}$, $4_{15}$, $4_{16}$, $4_{17}$, $4_{18}$.

Locating Key Ring 11

As mentioned earlier, a second wireless tag $6_2$ (FIG. 1) is attached to a key ring 11.

Referring to FIG. 1, if the user 10 wishes to find their keys, they can instruct the network 5 to locate the wireless tag $6_2$ via a computer 9 or PDA 12 having its own wireless tag $6_3$. The wireless tag $6_3$ comprises a wireless node 4 and a data interface (not shown) to the computer 9 or PDA 12. It will be appreciated that the wireless tag $6_3$ is not necessarily operating as a tag for the purposes of determining the position of the computer 9 or PDA 12, but as a convenient way of communicating with network 5.

Figure 13:
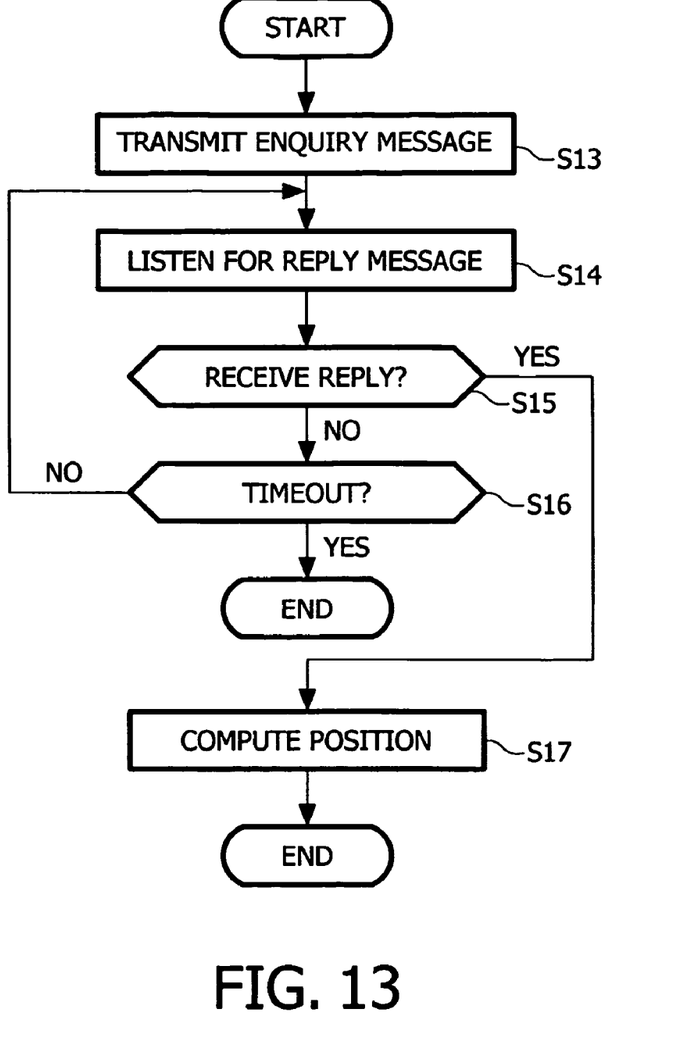
FIG. 13 is a process flow diagram of a method of locating a tag performed by an initiating wireless node.
Figure 14:
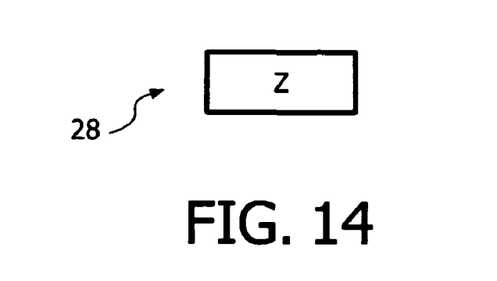
FIG. 14 illustrates a request transmitted by an initiating wireless node.

Referring to FIGS. 13 and 14, the wireless tag $6_3$ transmits an enquiry message 28 (step S13), specifying the identity of the wireless tag $6_2$ attached to key ring 11 for example with ID=Z, and begins to listen for a reply 29 (FIG. 18) (step S14). The wireless tag $6_3$ checks whether it has received a reply 29 (FIG. 16) (step S15) and whether it has "timed out" (step S16), i.e. whether a predetermined time has elapsed. If it receives a reply 29 (FIG. 18), then it computes a position and transmits this information to the computer 9 or PDA 12 (step S17).

Figure 15:
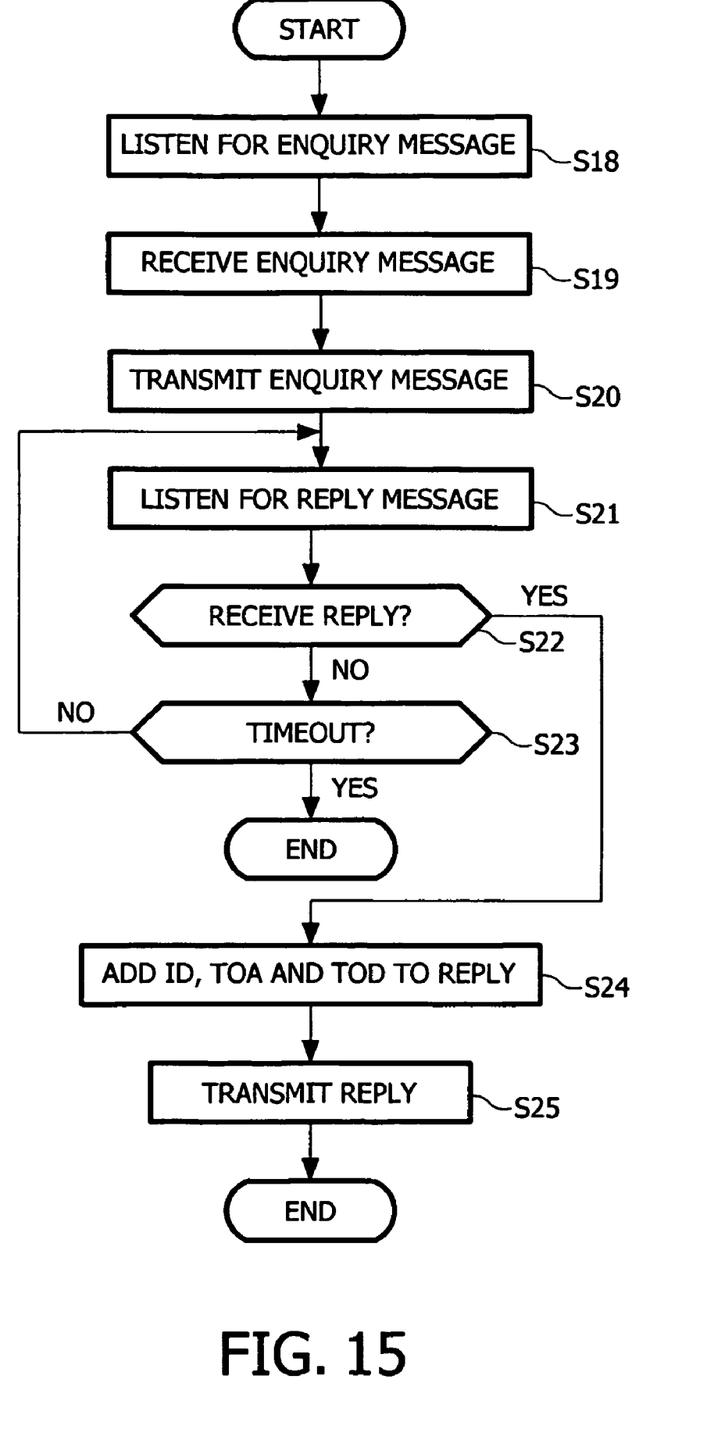
FIG. 15 is a process flow diagram of a method of locating a tag performed by a wireless node.

Referring to FIG. 15, each wireless node 4 listens out for enquiry messages 28 (FIG. 14) (step S18). If it receives such the enquiry message 28 (step S19), a wireless node 4 re-transmits the enquiry message 28 (step S20) and begins to listen for a reply 29 (FIG. 18) (step S21). The wireless node 22 checks whether it has received a reply 29 (FIG. 18) (step S22) and whether it has "timed out" (step S23), i.e. whether a predetermined time has elapsed.

The wireless tag $6_2$ periodically "wakes up" and listens for enquiry messages 28 (FIG. 14). It receives the enquiry message 28 and notes that the enquiry message 28 relates to it by examining the ID.

Figure 16:
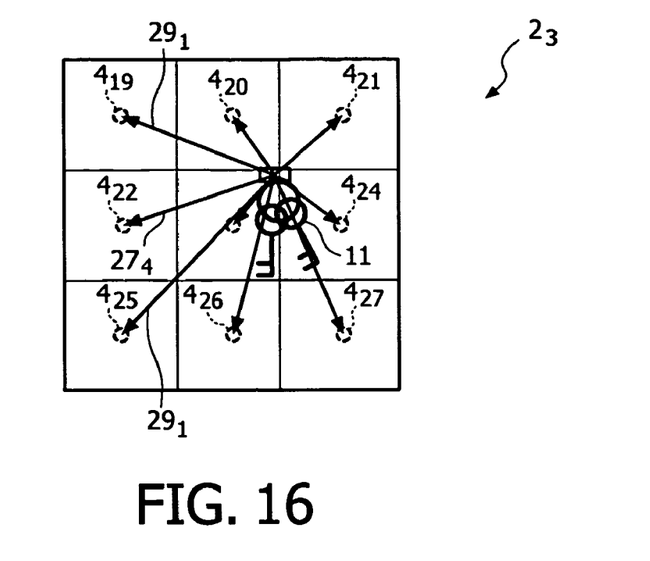
FIG. 16 is a magnified view of a portion of the plan shown in FIG. 1 in which a wireless tag associated with a key ring is located relative to a number of wireless nodes.
Figure 17:
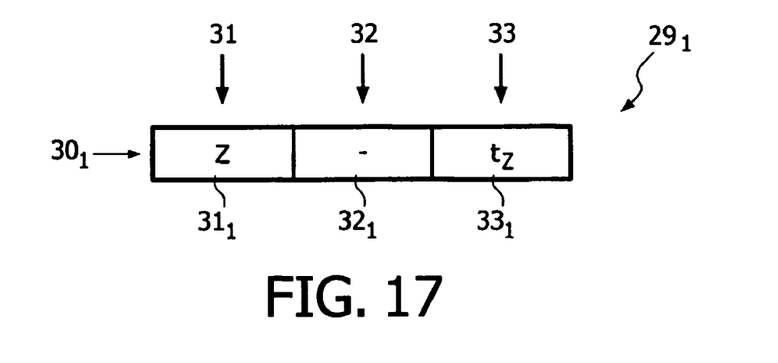
FIG. 17 illustrates a reply transmitted by a wireless tag.

Referring to FIGS. 16 and 17, the wireless tag $6_2$ transmits a reply $29_1$ comprising a first entry $30_1$. Each entry comprises a field 31 for identifying the node, a field 32 giving a time of arrival (TOA) of a previously received signal and a field 33 giving a time of departure (TOD) of a currently transmitted signal. In this case, a first identifying field $31_1$ comprises value "Z", a first TOA field $32_1$ is left blank or filled with a dummy value and a first TOD field $33_1$ comprises a value $t_z$.

The wireless tag $6_2$ may receive copies of the enquiry message 28 at different times, from different nodes and/or via different routes. To prevent proliferation of replies, the wireless tag $6_2$ may ignore a second and subsequent copy of the enquiry message 28.

The reply $29_1$ is transmitted to neighbouring nodes $4_{19}$, $4_{20}$, $4_{21}$, $4_{22}$, $4_{23}$, $4_{24}$, $4_{25}$, $4_{26}$, $4_{27}$.

Figure 18:
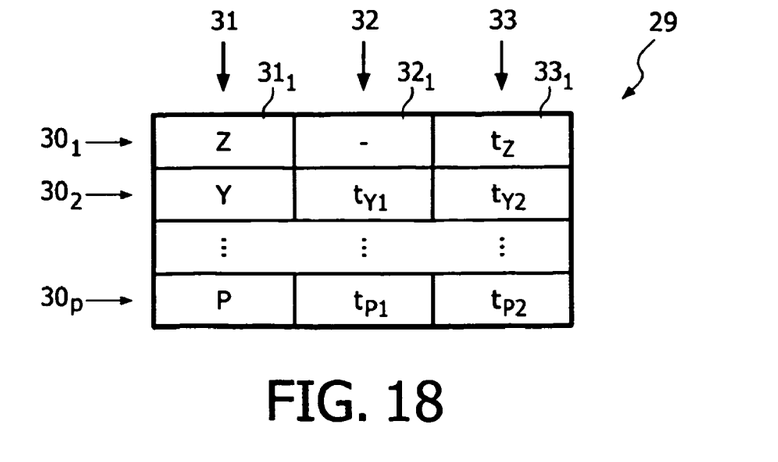
FIG. 18 illustrates a reply transmitted by a wireless node.

Referring again to FIG. 15 and also to FIG. 18, if a wireless node 4 receives the reply $29_1$ it prepares a new reply 29 by adding another entry $30_p$ including its identity $31_p$, a TOA $32_2$ and a TOD $33_2$ (step S24) and transmits the new reply 29 to neighbouring nodes 4 (step S25) until it reaches the wireless tag $6_3$ (FIG. 1).

The wireless tag $6_3$ (FIG. 1) receives a plurality of replies via different neighbouring nodes $4_{19}$, $4_{20}$, $4_{21}$, $4_{22}$, $4_{23}$, $4_{24}$, $4_{25}$, $4_{26}$, $4_{27}$ and can determine the position of the wireless tag $6_2$ using trilateration.

It will be appreciated that the wireless tag $6_3$ may determine the position of the wireless tag $6_2$ using replies received via only three or more of the neighbouring nodes $4_{19}$, $4_{20}$, $4_{21}$, $4_{22}$, $4_{23}$, $4_{24}$, $4_{25}$, $4_{26}$, $4_{27}$.

The embodiment of the present invention has advantages. Tiles can be moved for maintenance and, once replaced, do not need recalibrating. Tiles can be used on staircases and ramps. A carpet or tiles can be laid in the home. If further tiles are added, they can be easily detected and incorporated into the network. Fingerprinting, whereby signal strength is measured and logged throughout the building, is not required. Carpet fitters not having any technical knowledge or specialist training in positioning networks can lay the carpet or tiles.

Locating Wireless Nodes 4 in a Regular Configuration

The process described earlier by which location information flows through the network 5 and by which the spaced arrangement of nodes 4 can be determined may involve transfer of large amounts of data. However, if assumptions are made about the spaced arrangement of nodes 4, then a simpler process may be employed. In particular, if the tiles 3 are square or hexagonal, laid in a regular pattern and the wireless nodes 4 are notified of these facts, then the wireless nodes 4 can gather information about their surroundings more quickly.

Figure 19:
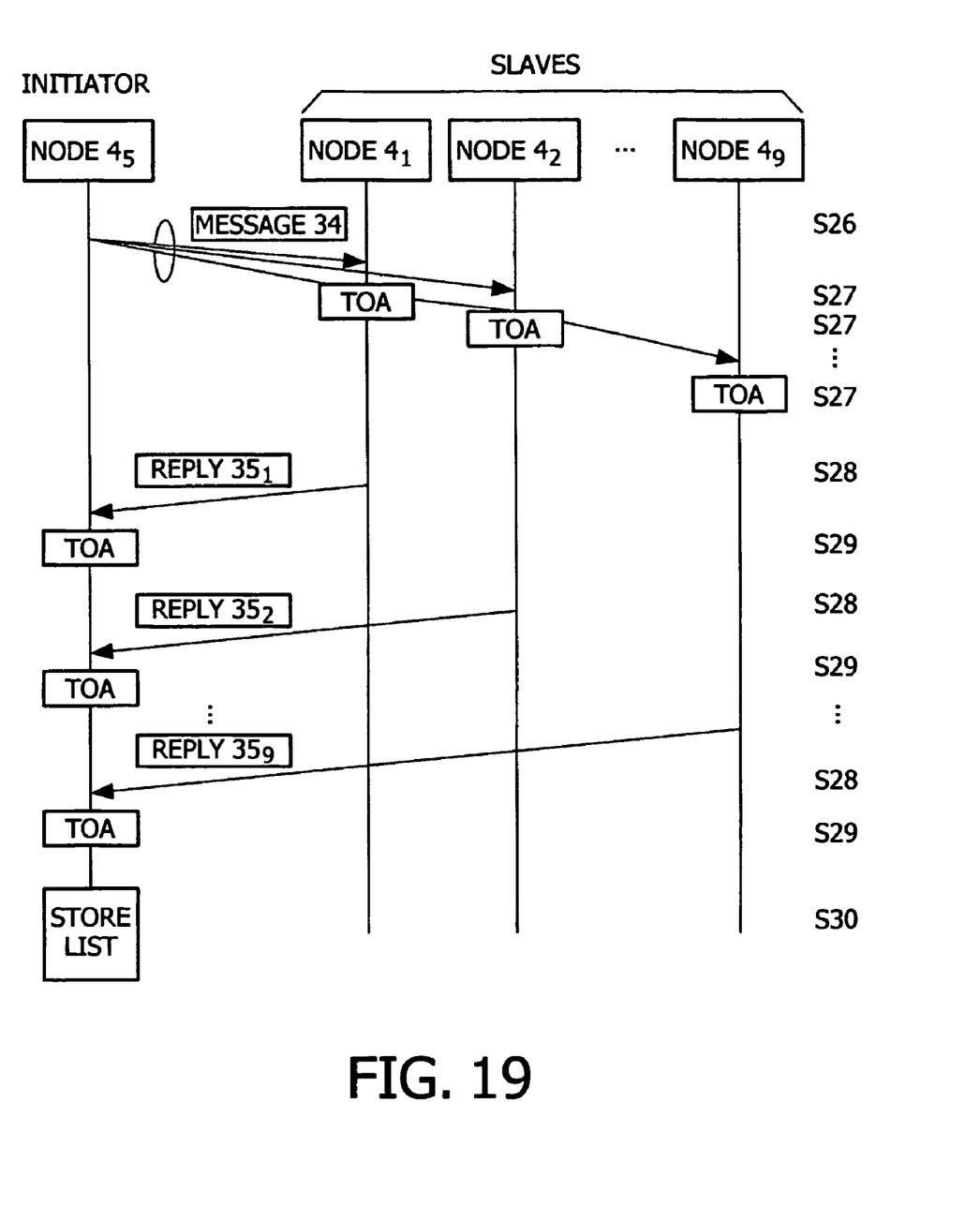
FIG. 19 is a process diagram of transmission of a request by a wireless node and reception of replies from neighbouring wireless nodes.

Referring to FIGS. 2 and 19, wireless nodes 4 can operate in two modes, namely initiator or slave mode.

In initiator mode, a wireless node 4, for example the fifth wireless node $4_5$, transmits a message 34 for reception by any nodes 4 within range (step S26). The message 34 is similar to the message $21_1$ shown in FIG. 6 except that the value of TOD may be omitted. Nevertheless, the wireless node $4_5$ makes a note of the TOD. The wireless node $4_5$ then waits for replies $35_1, 35_2, 35_g$. A wireless node $4_5$ can initiate transmission of a message periodically, randomly or on request.

In slave mode, a wireless node 4, for example wireless nodes $4_1, 4_2, 4_3, 4_4, 4_6, 4_7, 4_8, 4_9$, each wait for messages 34 from one or more master nodes $4_5$, notes a TOA (step S27) and transmits a reply $35_1, 35_2, 35_9$ (step S28). The reply $35_1, 35_2, 35_9$ is similar to that shown in FIG. 8 except that the value of TOD from the initiator is omitted. In other words, the reply $35_1, 35_2, 35_9$ includes the identity of the wireless node $4_5$, the identity of the wireless mode $4_1$ sending the reply and TOD from the wireless node $4_1$ are also specified.

The wireless node $4_5$ receives replies $35_1, 35_2, 35_9$, notes their TOAs (step S29), corrects for clock drift and stores a list of nodes it can "hear" (step S30), together with a range value, preferably as a distance in memory 16 (FIG. 4).

Each wireless node 4 takes turns to operate in initiator mode. Thus, steps 26, 29 and 30 may be performed by wireless node $4_1, 4_2, 4_3, 4_4, 4_6, 4_7, 4_8, 4_9$. Conversely, each wireless node 4 can operate in slave mode. It will be appreciated that wireless nodes 4 can also "go to sleep" and "wake up" periodically, randomly or according to a prearrange timetable and enter into initiator or slave mode.

Figure 20:
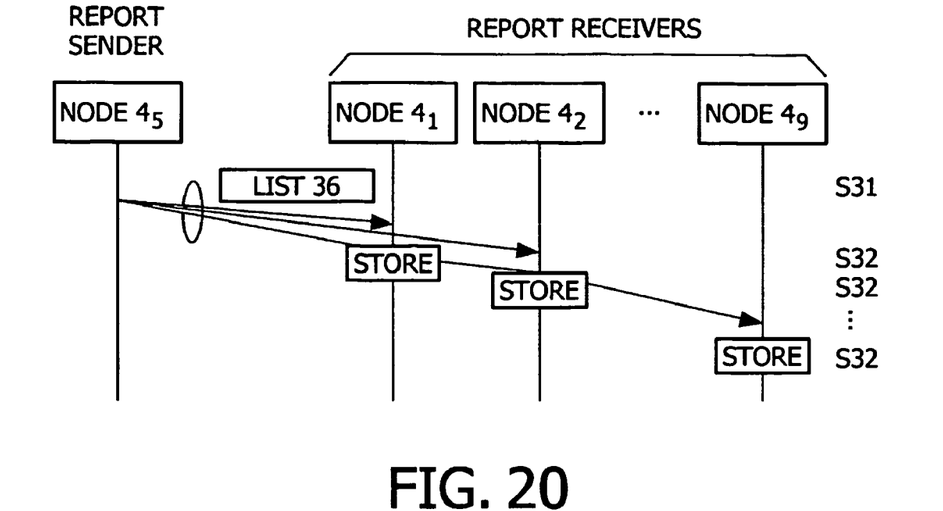
FIG. 20 is a process diagram of transmission of a list by a wireless node.

Referring to FIGS. 2 and 20, a wireless node 4 can also operate in two other modes, namely report sender and report receiving modes.

In report sender mode, a wireless node 4, for example wireless node $4_5$, transmits periodically, randomly or on request a list 36 of the neighbouring nodes it, or another node, can "hear" and respective ranges and, if known, its or the other node's known position (step S31). In report receiver mode, a wireless node 4 receives and stores a list of the neighbouring nodes another node can "hear" (step S32), together with respective ranges, if given, and known positions, if known. Using these lists and further information on layout, each wireless node can determine its own and other nodes' locations.

Referring to again FIG. 2, the fifth wireless node $4_5$ can hear first, second, third, fourth, sixth, seventh, eighth and ninth wireless nodes $4_1, 4_2, 4_3, 4_4, 4_6, 4_7, 4_8, 4_9$. If the fifth wireless node $4_5$ knows that the first wireless node $4_1$ cannot hear the third node $4_3$ and that the third node $4_3$ cannot hear the first wireless node $4_1$, then it can deduce that the first and third wireless nodes $4_1, 4_3$ are not next to each other. If the fifth wireless node $4_5$ knows that the second wireless node $4_2$ can hear the first and third nodes $4_1, 4_3$ then it can deduce that second node $4_2$ is between the first and third wireless nodes $4_1, 4_3$. If fifth wireless node $4_5$ also knows that the pattern is based on a square, then it can assume that the first and third wireless nodes are at corners of a square and assign possible x, y coordinates. By continuing through the list, the fifth wireless node $4_5$ can determine where its neighbours are located.

If wireless nodes 4 having known positions are "seeded", neighbouring nodes 4 can located themselves relative to one or more wireless nodes 4 of known position and thereby know their own location. This process can then propagate throughout the network. Thus, if first, second and fourth wireless nodes $4_1, 4_2, 4_4$, are known to be at locations (570, 30), (570, 90) and (510, 30) (expressed in centimetres) respectively, then the fifth wireless node $4_5$ may determine its location to be (510, 90), by virtue of receiving signals from these wireless nodes $4_1, 4_2, 4_4$ and knowing that a square pattern is being used. Using wireless nodes 4 having known positions also has the advantage that range measurements can be calibrated to take account of delays caused by internal processing which can otherwise increase the apparent range.

Other ways of expressing position, such defining a tile position in an array in the form (1, 1), (1, 2) for first and second nodes $4_1, 4_2$ respectively, may be used.

Locating Printer 7 Using a Regular Configuration of Wireless Nodes 4

Wireless nodes 4 throughout the network 5 can find their position either using the first process or the second, simpler process hereinbefore described. In either case, if a wireless node 4 knows its position, it can transmit a list 36 including its known position (step S31). Thus, using the process illustrated in FIG. 10, if each nearby node $4_{10}, 4_{11}, 4_{12}, 4_{13}, 4_{14}, 4_{15}, 4_{16}, 4_{17}, 4_{18}$ transmits a message including its known position, then wireless tag $6_1$ can determine its location.

Alternative Power Source

Figure 21:
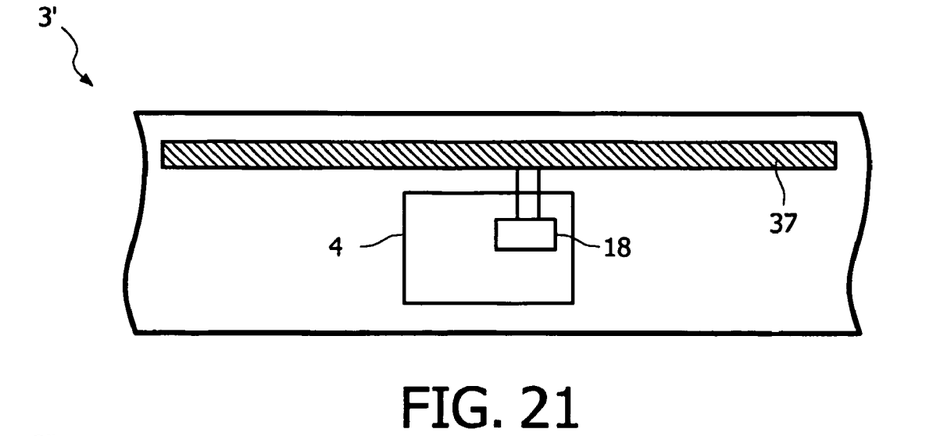
FIG. 21 is a cross sectional view of a tile including a wireless node and a piezoelectric crystal for generating power for the wireless node.

Referring to FIG. 21, a tile 3' may be provided with means 37 for generating power, preferably in the form of a piezoelectric crystal. When a person steps onto the tile 3', the piezoelectric crystal 37 is deformed and a voltage develops across it. The voltage may be used to re-charge battery 17.

Figure 22:
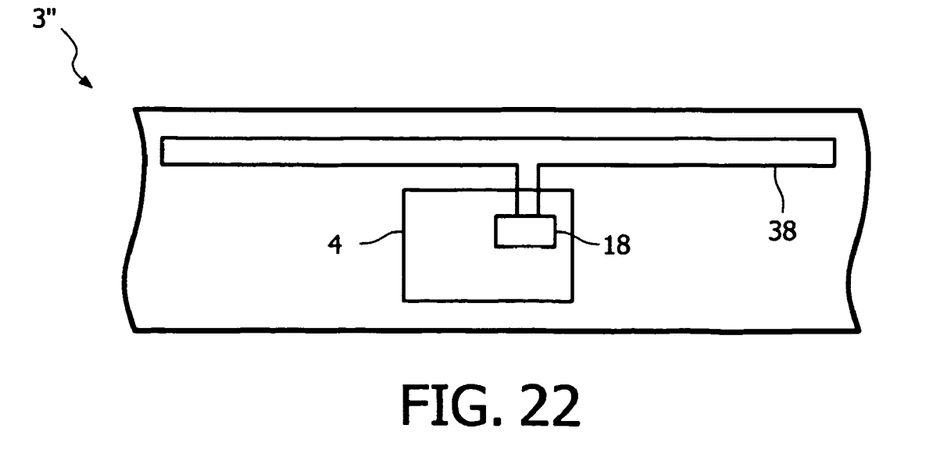
FIG. 22 is a cross sectional view of a tile including a wireless node and a loop for receiving power.

Referring to FIG. 22, a tile 3" may be provided with means 38 for receiving power, preferably in the form of a loop or coil. A loop or coil (nor shown) is provided, for example in a skirting board or additional layer, such as an underlay, and a current is passed through the loop or coil. A current is induced in the loop or coil 38 of the tile 3". This may be used to re-charge battery 17.

From reading the present disclosure, other variations and modifications will be apparent to persons skilled in the art. Such variations and modifications may involve equivalent and other features which are already known in the design, manufacture and use of systems for locating mobile units and component parts thereof and which may be used instead of or in addition to features already described herein.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A system for locating a wireless tag within a layer having a plurality of layer units, said layer comprising a plurality of independent wireless nodes, each node being included in a respective layer unit and configured to be wirelessly connectable to at least one other node, such that when said layer units are installed in a layer, said plurality of nodes have a determinable spaced arrangement, and provide overlapping wireless feedback to said tag by reference to said spaced arrangement, wherein the feedback from said plurality of nodes is used to determine a location of the tag.

2. The system according to claim 1, wherein said layer comprises a floor covering.

3. The system according to claim 1, wherein said layer comprises a carpet underlay.

4. The system according to claim 1, wherein said layer units include tiles for covering a floor.

5. The system according to claim 1, wherein said layer units include tiles for covering a ceiling.

6. The system according to claim 1, wherein said spaced arrangement comprises a regular pattern of nodes.

7. The system according to claim 1, wherein each wireless node includes means for receiving a wireless signal and means for transmitting a wireless signal.

8. The system according to claim 1, wherein each wireless node includes means for determining a range to a neighbouringneighboring wireless mode.

9. The system according to claim 8, wherein said means for determining a range comprises means for determining a time of arrival of a received signal.

10. The system according to claim 8, wherein said means for determining a range comprises means for determining a value of signal strength of a received signal.

11. The system according to claim 1 further comprising means for generating power for said wireless nodes.

12. The system according to claim 11, wherein said means for generating power comprises a piezoelectric crystal.

13. The system according to claim 1, further comprising means for receiving power for said wireless nodes from an external source.

14. The network or a network element according to claim 13, wherein said means for receiving power comprises inductive means.

15. A method of locating a wireless tag within a layer having a plurality of layer units using a network comprising a plurality of independent wireless nodes, each node being included in a respective layer unit, each node being and configured to be wirelessly connectable to at least one other node, the method comprising the acts of:
  determining a spaced arrangement of said plurality of wireless nodes; and
  providing overlapping wireless feedback to said wireless tag from said plurality of wireless nodes with reference to said spaced arrangement; and
  determining a location of the tag using the feedback from said plurality of nodes.

16. The method according to claim 15, wherein said act of determining said spaced arrangement of said wireless nodes comprises acts of:
  transmitting at least one message from a first node said at least one message identifying said first node;
  noting a time of arrival of said at least one message at a second node and transmitting at least one message from said second node, said at least one message from said second node identifying said first and second nodes, the time of arrival of said at least one message from said first node and a time of transmission of said at least one message from said second node.

17. The method according to claim 16, wherein the at least one message from said first node includes information identifying the location of said first node within said spaced arrangement.

18. The method according to claim 15, further comprising acts of:
  co-operating with said at least one other node so as to determine location of said wireless node within a spaced arrangement of wireless nodes; and
  co-operating with a wireless tag so as to determine location of said wireless tag with reference to said spaced arrangement of wireless nodes.

19. A computer readable medium comprising a program of instructions which, when executed by data processing apparatus causes said data processing apparatus to perform the method according to claim 18.

\* \* \* \* \*